(12) United States Patent
Lyu et al.

(10) Patent No.: US 9,801,172 B2
(45) Date of Patent: Oct. 24, 2017

(54) BROADCAST INFORMATION SENDING METHOD, BROADCAST INFORMATION RECEIVING METHOD, DEVICE, AND SYSTEM

(71) Applicant: Huawei Technologies Co., Ltd., Shenzhen (CN)

(72) Inventors: Yongxia Lyu, Beijing (CN); Tong Ji, Beijing (CN); Wen Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/873,988

(22) Filed: Oct. 2, 2015

(65) Prior Publication Data
US 2016/0029354 A1 Jan. 28, 2016

Related U.S. Application Data

(63) Continuation of application No. PCT/CN2013/073738, filed on Apr. 3, 2013.

(51) Int. Cl.
*G01R 31/08* (2006.01)
*H04L 12/16* (2006.01)
(Continued)

(52) U.S. Cl.
CPC ............ *H04W 72/042* (2013.01); *H04B 1/69* (2013.01); *H04L 12/18* (2013.01); *H04W 4/06* (2013.01); *H04B 2001/6908* (2013.01)

(58) Field of Classification Search
CPC ............................ H04W 72/042; H04L 12/18
See application file for complete search history.

(56) References Cited

U.S. PATENT DOCUMENTS

2009/0176490 A1* 7/2009 Kazmi ................ H04J 11/0093
455/434
2010/0272037 A1 10/2010 Lee et al.
(Continued)

FOREIGN PATENT DOCUMENTS

CN 101771951 A 7/2010
CN 101836376 A 9/2010
(Continued)

OTHER PUBLICATIONS

"$3^{rd}$ Generation Partnership Project; Technical Specification Group Radio Access Network; Evolved Universal Terrestrial Radio Access (E-UTRA); Multiplexing and channel coding (Release 10)," 3GPP TS 36.212, V10.1.0, pp. 1-76, $3^{rd}$ Generation Partnership Project, Valbonne, France (Mar. 2011).
(Continued)

*Primary Examiner* — Faruk Hamza
*Assistant Examiner* — Abu-Sayeed Haque
(74) *Attorney, Agent, or Firm* — Leydig, Voit & Mayer, Ltd.

(57) ABSTRACT

Embodiments of the present invention disclose a broadcast information sending method, a broadcast information receiving method, a device, and a system, relate to the communications field, and are used to reduce system overheads, and improve coverage performance. The method provided by the embodiments of the present invention includes: sending, by a network device on a physical broadcast channel PBCH, PBCH information to user equipment UE, and sending, by the network device, the PBCH information in a specific radio frame in each period T of the PBCH, where the PBCH information only includes information about a system frame number SFN, and the period T is greater than one radio frame.

16 Claims, 5 Drawing Sheets

A network device sends, on a physical broadcast channel PBCH, PBCH information to user equipment UE, and the network device sends the PBCH information in a specific radio frame in each period T of the PBCH, where the PBCH information only includes information about a system frame number SFN, and the period T is greater than one radio frame — S101

(51) Int. Cl.
*H04B 7/00* (2006.01)
*H04J 3/00* (2006.01)
*H04W 72/04* (2009.01)
*H04W 4/06* (2009.01)
*H04B 1/69* (2011.01)
*H04L 12/18* (2006.01)

(56) References Cited

U.S. PATENT DOCUMENTS

| | | |
|---|---|---|
| 2011/0235743 A1 | 9/2011 | Lee et al. |
| 2012/0039256 A1 | 2/2012 | Kwon et al. |
| 2012/0163249 A1* | 6/2012 | Chin ............... H04W 36/0066 370/280 |
| 2012/0250620 A1 | 10/2012 | Hu |
| 2012/0289289 A1 | 11/2012 | Tanno et al. |
| 2013/0028126 A1* | 1/2013 | Kazmi ............. H04W 36/0088 370/252 |
| 2013/0163569 A1* | 6/2013 | Lee .................. H04L 1/0045 370/336 |
| 2013/0258936 A1* | 10/2013 | Choi ................ H04W 72/0453 370/312 |
| 2013/0343318 A1* | 12/2013 | Gruet ..................... H04L 5/001 370/329 |
| 2014/0036749 A1* | 2/2014 | Wang ................... H04W 28/12 370/311 |
| 2014/0064122 A1* | 3/2014 | Chin ..................... H04W 36/14 370/252 |

FOREIGN PATENT DOCUMENTS

| | | |
|---|---|---|
| CN | 102026375 A | 4/2011 |
| WO | 2008156066 A1 | 12/2008 |
| WO | WO 2011032107 A1 | 3/2011 |
| WO | WO 2012087361 A1 | 6/2012 |
| WO | WO 2014110949 A1 | 7/2014 |

OTHER PUBLICATIONS

"Physical channels coverage enhancements for MTC," 3GPP TSG RAN WG1 Meeting #72, St. Julian's, Malta, R1-130423, 3rd Generation Partnership Project, Valbonne, France (Jan. 28-Feb. 1, 2013).

* cited by examiner

A network device sends, on a physical broadcast channel PBCH, PBCH information to user equipment UE, and the network device sends the PBCH information in a specific radio frame in each period T of the PBCH, where the PBCH information only includes information about a system frame number SFN, and the period T is greater than one radio frame — S101

A user equipment UE receives PBCH information that is sent on a physical broadcast channel PBCH by a network device, and the user equipment receives the PBCH information in a specific radio frame in each period T of the PBCH, where the PBCH information only includes information about a system frame number SFN, and the period T is greater than one radio frame ⟋ S501

BROADCAST INFORMATION SENDING METHOD, BROADCAST INFORMATION RECEIVING METHOD, DEVICE, AND SYSTEM

CROSS-REFERENCE

This application is a continuation of International Patent Application No. PCT/CN2013/073738, filed Apr. 3, 2013, which is hereby incorporated by reference in its entirety.

TECHNICAL FIELD

The present invention relates to the communications field, and in particular, to a broadcast information sending method, and a broadcast information receiving method, a device, and a system.

BACKGROUND

An LTE user terminal needs to select, after being turned on, a suitable public land mobile network (Public Land Mobile Network, PLMN for short), further performs cell searching and cell measurement to obtain frame timing of peripheral cells and strength information of the cells, and then selects a suitable cell to receive broadcast information, so as to achieve synchronization with a severing cell and finally reside in a typical cellular system. Because a configuration and operation information in another channel of a cell is carried by a broadcast channel (Broadcast Channel, BCH for short), coverage implemented by receiving the BCH is crucial to successful operation of a system such as cellular communications. The broadcast information may be classified into two types:

(1) a master information block (Master information Block, MIB for short), which includes a limited quantity of most common transmission parameters, where these parameters are transmitted on a physical broadcast channel (Physical Broadcast Channel, PBCH for short), and are necessary for an initial access to a cell; and (2) a system information block (System Information Block, SIB for short), which is multiplexed, at a physical layer, with unicast data transmitted on a PDSCH (Physical Downlink Share Channel, physical downlink share channel).

The PBCH has some special design requirements, for example, low system overheads and completely reliable reception on an edge of an LTE cell. The low system overheads of the PBCH may be implemented by carrying a minimum amount of information in the PBCH, because for a large amount of data, implementation of strict coverage causes high system overheads.

However, MIB information in a PBCH in the prior art includes a downlink system bandwidth (3 bit), physical HARQ indicator channel (Physical Hybrid ARQ indicator Channel, PHICH for short) structure information (3 bit), and 8-bit high bit of a system frame number, and a 10-bit idle bit, and therefore, there is totally 24-bit information, causing relatively high system overheads and poor coverage performance.

SUMMARY

Embodiments of the present invention provide a broadcast information sending method, a broadcast information receiving method, a device, and a system, which provide a new PBCH to send PBCH information, where the PBCH information only includes information about a system frame number SFN, so that the PBCH in the embodiments of the present invention carries less information, and accordingly occupies fewer system resources than an existing LTE PBCH does, thereby reducing system overheads, and achieving better coverage performance than the existing LTE PBCH does.

To achieve the foregoing objective, the embodiments of the present invention use the following technical solutions:

According to a first aspect, a broadcast information sending method is provided, including:

sending, by a network device on a physical broadcast channel PBCH, PBCH information to user equipment UE, and sending, by the network device, the PBCH information in a specific radio frame in each period T of the PBCH, where the PBCH information only includes information about a system frame number SFN, and the period T is greater than one radio frame.

In a first possible implementation manner, according to the first aspect, a sum of a quantity $N_{SFN}$ of bits included in the information about the SFN and a quantity $N_T$ of bits that is corresponding to each period T of the PBCH is less than or equal to a total quantity K of bits required by the system frame number.

In a second possible implementation manner, with reference to the first possible implementation manner, the quantity of bits that is corresponding to each period of the PBCH is $N_T$=Ceiling ($\log_2 P$), where P is a quantity of radio frames included in each period T of the PBCH.

In a third possible implementation manner, with reference to the second possible implementation manner, P is an integral power of 2, and the quantity of bits that is corresponding to each period of the PBCH is $N_T=\log_2 P$.

In a fourth possible implementation manner, according to the first aspect, with reference to any one of the first to the third possible implementation manners, the PBCH information in the PBCH is mapped to 72 subcarriers in a frequency domain center of an OFDM signal.

In a fifth possible implementation manner, according to the first aspect, with reference to any one of the first to the third possible implementation manners, when a network in which the PBCH is located does not coexist with another network, the PBCH and a synchronization signal are staggered in a time domain; or when a network in which the PBCH is located coexists with another network, the PBCH, a synchronization signal, and a PBCH of the another network are staggered in a time domain.

In a sixth possible implementation manner, with reference to the fifth possible implementation manner, the PBCH occupies, in the time domain, all or some OFDM symbols of N subframes in the specific radio frame in each period T, where N is greater than or equal to 1.

In a seventh possible implementation manner, with reference to the sixth possible implementation manner, in a frequency division duplex FDD system, the PBCH occupies the last 11 OFDM symbols of other subframes than a subframe 0 and a subframe 5 in the N subframes within the specific radio frame in each period T when a normal CP is used and the last 9 OFDM symbols of the other subframes when an extended CP is used, where N is greater than or equal to 1; or the PBCH occupies second timeslots of other subframes than a subframe 0 in the N subframes within the specific radio frame in each period T, where N is greater than or equal to 1.

In an eighth possible implementation manner, with reference to the fifth possible implementation manner, in a time division duplex TDD system, a position, of the PBCH, within the specific radio frame is applicable to all uplink/downlink configurations.

In a ninth possible implementation manner, with reference to the eighth possible implementation manner, the PBCH occupies some or all of the following OFDM symbols within the specific radio frame: the third OFDM symbol in a subframe 1, the third OFDM symbol in a subframe 6, all OFDM symbols in a subframe 0, and all OFDM symbols in a subframe 5.

In a tenth possible implementation manner, according to the first aspect or with reference to any one of the first to the ninth possible implementation manners, the PBCH information in the PBCH is sent in a spread-spectrum manner.

According to a second aspect, a broadcast information receiving method is provided, including:

receiving, by user equipment UE, PBCH information that is sent, on the physical broadcast channel PBCH, by a network device to the UE, and receiving, by the user equipment, the PBCH information in a specific radio frame in each period T of the PBCH, where the PBCH information only includes information about a system frame number SFN, and the period T is greater than one radio frame.

In a first possible implementation manner, according to the second aspect, a sum of a quantity $N_{SFN}$ of bits included in the information about the SFN and a quantity $N_T$ of bits that is corresponding to each period T of the PBCH is less than or equal to a total quantity K of bits required by the system frame number.

In a second possible implementation manner, with reference to the first possible implementation manner, the quantity of bits that is corresponding to each period of the PBCH is $N_T=\text{Ceiling}(\log_2 P)$, where P is a quantity of radio frames included in each period T of the PBCH.

In a third possible implementation manner, with reference to the second possible implementation manner, P is an integral power of 2, and the quantity of bits that is corresponding to each period of the PBCH is $N_T=\log_2 P$.

In a fourth possible implementation manner, according to the second aspect, with reference to any one of the first to the third possible implementation manners, the PBCH information in the PBCH is mapped to 72 subcarriers in a frequency domain center of an OFDM signal.

In a fifth possible implementation manner, according to the second aspect, with reference to any one of the first to the third possible implementation manners, when a network in which the PBCH is located does not coexist with another network, the PBCH and a synchronization signal are staggered in a time domain; or when a network in which the PBCH is located coexists with another network, the PBCH, a synchronization signal, and a PBCH of the another network are staggered in a time domain.

In a sixth possible implementation manner, with reference to the fifth possible implementation manner, the PBCH occupies, in the time domain, all or some OFDM symbols of N subframes in the specific radio frame in each period T, where N is greater than or equal to 1.

In a seventh possible implementation manner, with reference to the sixth possible implementation manner, in a frequency division duplex FDD system, the PBCH occupies the last 11 OFDM symbols of other subframes than a subframe 0 and a subframe 5 in the N subframes within the specific radio frame in each period T when a normal CP is used and the last 9 OFDM symbols of the other subframes when an extended CP is used, where N is greater than or equal to 1; or the PBCH occupies second timeslots of other subframes than a subframe 0 in the N subframes within the specific radio frame in each period T, where N is greater than or equal to 1.

In an eighth possible implementation manner, with reference to the fifth possible implementation manner, in a time division duplex TDD system, a position, of the PBCH, within the specific radio frame is applicable to all uplink/downlink configurations.

In a ninth possible implementation manner, with reference to the eighth possible implementation manner, the PBCH occupies some or all of the following OFDM symbols within the specific radio frame: the third OFDM symbol in a subframe 1, the third OFDM symbol in a subframe 6, all OFDM symbols in a subframe 0, and all OFDM symbols in a subframe 5.

In a tenth possible implementation manner, according to the second aspect or with reference to any one of the first to the ninth possible implementation manners, the PBCH information in the PBCH is sent in a spread-spectrum manner.

According to a third aspect, a network device is provided, including:

a sender, configured to send, on a physical broadcast channel PBCH, PBCH information to user equipment UE, and configured to send the PBCH information in a specific radio frame in each period T of the PBCH, where the PBCH information only includes information about a system frame number SFN, and the period T is greater than one radio frame.

In a first possible implementation manner, according to the third aspect, a sum of a quantity $N_{SFN}$ of bits included in the information about the SFN and a quantity $N_T$ of bits that is corresponding to each period T of the PBCH is less than or equal to a total quantity K of bits required by the system frame number.

In a second possible implementation manner, with reference to the first possible implementation manner, the quantity of bits that is corresponding to each period of the PBCH is $N_T=\text{Ceiling}(\log_2 P)$, where P is a quantity of radio frames included in each period T of the PBCH.

In a third possible implementation manner, with reference to the second possible implementation manner, P is an integral power of 2, and the quantity of bits that is corresponding to each period of the PBCH is $N_T=\log_2 P$.

In a fourth possible implementation manner, according to the third aspect, with reference to any one of the first to the third possible implementation manners, the PBCH information in the PBCH is mapped to 72 subcarriers in a frequency domain center of an OFDM signal.

In a fifth possible implementation manner, according to the third aspect, with reference to any one of the first to the third possible implementation manners, when a network in which the PBCH is located does not coexist with another network, the PBCH and a synchronization signal are staggered in a time domain; or when a network in which the PBCH is located coexists with another network, the PBCH, a synchronization signal, and a PBCH of the another network are staggered in a time domain.

In a sixth possible implementation manner, with reference to the fifth possible implementation manner, the PBCH occupies, in the time domain, all or some OFDM symbols of N subframes in the specific radio frame in each period T, where N is greater than or equal to 1.

In a seventh possible implementation manner, with reference to the sixth possible implementation manner, in a frequency division duplex FDD system, the PBCH occupies the last 11 OFDM symbols of other subframes than a subframe 0 and a subframe 5 in the N subframes within the specific radio frame in each period T when a normal CP is used and the last 9 OFDM symbols of the other subframes when an extended CP is used, where N is greater than or equal to 1; or the PBCH occupies second timeslots of other subframes than a subframe 0 in the N subframes within the specific radio frame in each period T, where N is greater than or equal to 1.

In an eighth possible implementation manner, with reference to the fifth possible implementation manner, in a time division duplex TDD system, a position, of the PBCH, within the specific radio frame is applicable to all uplink/downlink configurations.

In a ninth possible implementation manner, with reference to the eighth possible implementation manner, the PBCH occupies some or all of the following OFDM symbols within the specific radio frame: the third OFDM symbol in a subframe 1, the third OFDM symbol in a subframe 6, all OFDM symbols in a subframe 0, and all OFDM symbols in a subframe 5.

In a tenth possible implementation manner, according to the third aspect or with reference to any one of the first to the ninth possible implementation manners, the PBCH information in the PBCH is sent in a spread-spectrum manner.

According to a fourth aspect, user equipment is provided, including: a receiver, configured to receive PBCH information that is sent, on the physical broadcast channel PBCH, by a network device to the user equipment UE, and configured to receive the PBCH information in a specific radio frame in each period T of the PBCH, where the PBCH information only includes information about a system frame number SFN, and the period T is greater than one radio frame.

In a first possible implementation manner, according to the fourth aspect, a sum of a quantity $N_{SFN}$ of bits included in the information about the SFN and a quantity $N_T$ of bits that is corresponding to each period T of the PBCH is less than or equal to a total quantity K of bits required by the system frame number.

In a second possible implementation manner, with reference to the first possible implementation manner, the quantity of bits that is corresponding to each period of the PBCH is $N_T$=Ceiling ($\log_2 P$), where P is a quantity of radio frames included in each period T of the PBCH.

In a third possible implementation manner, with reference to the second possible implementation manner, P is an integral power of 2, and the quantity of bits that is corresponding to each period of the PBCH is $N_T=\log_2 P$.

In a fourth possible implementation manner, according to the fourth aspect, with reference to any one of the first to the third possible implementation manners, the PBCH information in the PBCH is mapped to 72 subcarriers in a frequency domain center of an OFDM signal.

In a fifth possible implementation manner, according to the fourth aspect, with reference to any one of the first to the third possible implementation manners, when a network in which the PBCH is located does not coexist with another network, the PBCH and a synchronization signal are staggered in a time domain; or when a network in which the PBCH is located coexists with another network, the PBCH, a synchronization signal, and a PBCH of the another network are staggered in a time domain.

In a sixth possible implementation manner, with reference to the fifth possible implementation manner, the PBCH occupies, in the time domain, all or some OFDM symbols of N subframes in the specific radio frame in each period T, where N is greater than or equal to 1.

In a seventh possible implementation manner, with reference to the sixth possible implementation manner, in a frequency division duplex FDD system, the PBCH occupies the last 11 OFDM symbols of other subframes than a subframe 0 and a subframe 5 in the N subframes within the specific radio frame in each period T when a normal CP is used and the last 9 OFDM symbols of the other subframes when an extended CP is used, where N is greater than or equal to 1; or the PBCH occupies second timeslots of other subframes than a subframe 0 in the N subframes within the specific radio frame in each period T, where N is greater than or equal to 1.

In an eighth possible implementation manner, with reference to the fifth possible implementation manner, in a time division duplex TDD system, a position, of the PBCH, within the specific radio frame is applicable to all uplink/downlink configurations.

In a ninth possible implementation manner, with reference to the eighth possible implementation manner, the PBCH occupies some or all of the following OFDM symbols within the specific radio frame: the third OFDM symbol in a subframe 1, the third OFDM symbol in a subframe 6, all OFDM symbols in a subframe 0, and all OFDM symbols in a subframe 5.

In a tenth possible implementation manner, according to the fourth aspect or with reference to any one of the first to the ninth possible implementation manners, the PBCH information in the PBCH is sent in a spread-spectrum manner.

According to a fifth aspect, a broadcast information sending and receiving system is provided, including the foregoing network device and user equipment.

The broadcast information sending method, broadcast information receiving method, device, and system according to the embodiments of the present invention provide a new PBCH to send PBCH information, where the PBCH information only includes information about a system frame number SFN, so that the PBCH in the embodiments of the present invention carries less information, and accordingly occupies fewer system resources than an existing LTE PBCH does, thereby reducing system overheads, and achieving better coverage performance than the existing LTE PBCH does.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention have a better implementation effect in a scenario in which there are a large number of small packet services and there is a high requirement on coverage performance, for example, a machine to machine (Machine to Machine, M2M for short) scenario. M2M communications are widely applied, and are closely related to lives of people. For example, the M2M communications may be involved in an intelligent utility meter. Data about household power consumption and gas consumption is transferred by the M2M communications to a public utility institution, and the public utility institution adjusts production thereof by using all the information, so that the production meets an actual demand. For another example, the M2M communications may be involved in an automotive industry. By using a fleet management system, transportation companies or enterprise vehicle supervisors can track their vehicles in real time by the M2M communications, or the M2M communications are used in emergencies, maintenance, and location services.

Certainly, the present invention is not limited to the foregoing application scenarios.

The method provided in this embodiment of the present invention may be applied to various communications systems, such as: a global system for mobile communications (GSM) network, a general packet radio service (General Packet Radio Service, GPRS) network, a wideband code division multiple access (Wideband Code Division Multiple Access, WCDMA) network, a CDMA-2000 network, a time division synchronous code division multiple access (Time Division Synchronous Code Division Multiple Access, TD-SCDMA for short) network, and a worldwide interoperability for microwave access (Worldwide Interoperability for Microwave Access, WiMAX for short) network.

The embodiments of the present invention are described below by using a system architecture evolution (System Architecture Evolution, SAE for short/long term evolution (Long Term Evolution, LTE for short) network as an example. Certainly, the present invention is not limited to this scenario.

Exemplarily, the SAE/LTE network may include a radio access network node (for example, eNodeB), a core network node (for example, a mobility management entity MME: Mobility Management Entity), a service gateway (S-GW: Server Gateway) and a packet data gateway (P-GW: Packet Data Network Gateway).

The radio access network node is used for providing an air interface for user equipment, so that the user equipment accesses the SAE/LTE network. The core network node is a control plane entity, is responsible for a core network control function of the SAE/LTE network, and used for performing mobility management and session management of user equipment. The service gateway and the packet data gateway may be user plane entities, and used for providing a data transmission service for user equipment.

Figure 1:
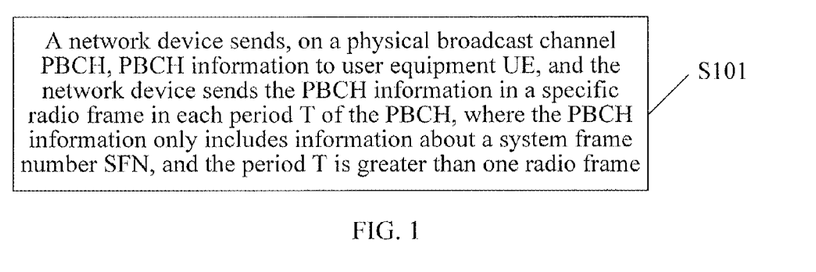
FIG. 1 is a flowchart of a broadcast information sending method according to an embodiment of the present invention.

According to an aspect, an embodiment of the present invention provides a broadcast information sending method. Referring to FIG. 1, the method includes:

S101: A network device sends, on a physical broadcast channel PBCH, PBCH information to user equipment UE, and the network device sends the PBCH information in a specific radio frame in each period T of the PBCH, where the PBCH information only includes information about a system frame number SFN, and the period T is greater than one radio frame.

Exemplarily, the information about the SFN in this embodiment may be sent solely on the PBCH; or the information about the SFN may be added to an MIB message and then the MIB message is sent on the PBCH. In this case, the MIB message only includes the information about the SFN, without including downlink system bandwidth information and PHICH structure information, and therefore, an information amount on the PBCH is greatly reduced. By using an existing system frame number as an example, there are a total of 1024 existing system frame numbers, which range from 0 to 1023, and therefore, only 10 bits are required for transmission, which are 14 bits fewer than those required in the prior art. In this way, utilization of PBCH resources may be greatly reduced, and accordingly system overheads are reduced and coverage performance is improved.

Exemplarily, for ease of reliable reception of an LTE PBCH, and for further reducing an information amount on the PBCH, a time-diversity mechanism may be used. For example, the information about the SFN is sent in a specific radio frame in each period T of the PBCH, and then a total quantity K of bits required by the system frame number may be at least constituted by a quantity $N_{SFN}$ of bits included in the information about the SFN together with a quantity $N_T$ of bits that is corresponding to the period T of the PBCH, and therefore, the quantity $N_{SFN}$ of bits included in the information about the SFN may meet $N_{SFN} \leq K - N_T$.

For example, when the total quantity K of bits required by the system frame number is only constituted by the quantity $N_{SFN}$ of bits included in the information about the SFN together with the quantity $N_T$ of bits that is corresponding to the period T of the PBCH, the quantity $N_{SFN}$ of bits included in the information about the SFN may be $K - N_T$, where $N_T = \text{Ceiling}(\log_2 P)$, P is a quantity of radio frames included in each period T of the PBCH, and each period T is greater than one radio frame. Exemplarily, when the period T is longer, $N_T$ is larger, and correspondingly, a smaller $N_{SFN}$ indicates a smaller information amount of the information about the SFN, but a delay of receiving the information about the SFN by the user equipment is also correspondingly prolonged. A preferred period T of this embodiment of the present invention ranges from 40 ms to 160 ms.

Preferably, when P is an integral power of 2, the quantity of bits that is corresponding to each period T of the PBCH is $N_T = \log_2 P$, and correspondingly, the quantity of bits included in the information about the SFN at least may be reduced by $\log_2 P$.

For example, it is assumed that each period T of the PBCH is 40 ms, 2-bit information in 10-bit information may be borne by frame positions in 40 ms, for example, 00 represents a first 10 ms frame, 01 represents a second 10 ms frame, 10 represents a third 10 ms frame, and 11 represents a fourth 10 Ms frame. In this way, for the information about the SFN, only 8-bit information is required to represent a complete system frame number. For another example, when a longer period of the PBCH is used, for example, 160 ms, for the information about the SFN, only 6-bit information is required to represent a complete system frame number.

Exemplarily, the information about the SFN in this embodiment of the present invention may be transmitted in the specific radio frame in the period T, and the user equipment may combine data of all radio frames in at least one radio frame to acquire information about a complete SFN, where the at least one radio frame may be preset according to a standard. For example, how many radio frames in one period are specifically selected for transmission of the information about the SFN, and which radio frames are selected can be preset according to a standard. What is preset according to the standard is no longer changed during use, and certainly, the setting may also be changed according to a requirement.

Exemplarily, in order to facilitate spectrum spreading to acquire better coverage performance, in the PBCH in this embodiment of the present invention, each radio frame in the period T is not made to correspond to a redundancy version, and only the information about the SFN on the PBCH is simply repeated, without addition of any other information. Exemplarily, in order that the user equipment can determine positions of radio frames in a period so as to determine $N_T$ bits corresponding to the positions of the radio frames, the user equipment may use the information about the SFN in the period is received as a first radio frame (or a radio frame at a fixed position), and then successively reckon remaining radio frames in the period. For example, it is assumed that the period T is 160 ms, and each period T includes 16 radio frames, which are separately marked, in this embodiment, as a radio frame 1, a radio frame 2, a radio frame 3, . . . , a radio frame 16. A system sets that a network device sends the information about the SFN in the radio frame 1, the radio frame 2, and the radio frame 5, and then the user equipment obtains information about a complete SFN after receiving data sent in the radio frame 1, the radio frame 2, and the radio frame 5; the user equipment may use the complete SFN as a system frame number of a current subframe (the radio frame 5), and then successively reckon remaining radio frames in the period.

Preferably, in order that the user equipment can more conveniently distinguish the positions of the radio frames in the period T, the information about the SFN may be transmitted in a specific radio frame of each period T. Exemplarily, the user equipment may set by default that a radio frame in which the user equipment performs an access is a first radio frame (or a radio frame at a fixed position), and then successively reckon remaining radio frames in the period. For example, it is assumed that the period T is 160 ms, and each period T includes 16 radio frames, which are separately marked, in this embodiment, as a radio frame 1, a radio frame 2, a radio frame 3, . . . , a radio frame 16 . A system sets that the network device sends the information about the SFN in the radio frame 2, where the radio frame 2 is a radio frame in which the user equipment performs an access, and then the user equipment obtains information about a complete SFN after correctly receiving data sent in the radio frame 2; and the user equipment may use the complete SFN as a system frame number of a current subframe, and then successively reckon remaining radio frames in the period.

It should be noted that, each radio frame in the period T of the PBCH may be selected as a specific radio frame for sending the information about the SFN, and which radio frame in the period T of the PBCH is used for sending the information about the SFN is not limited in this embodiment, and may be preset according to a standard. Certainly, the standard may also change the setting according to a requirement.

Exemplarily, the PBCH in this embodiment may be a PBCH newly set by the network device according to an available resource.

Exemplarily, in a frequency domain, the network device may map the information in the PBCH to 72 subcarriers in a frequency domain center of an OFDM signal.

Exemplarily, when a network in which the PBCH is located does not coexist with another network, the PBCH and a synchronization signal are staggered in a time domain; or when a network in which the PBCH is located coexists with another network, the PBCH, a synchronization signal, and a PBCH of the another network are staggered in a time domain. For example, the PBCH may occupy all or some OFDM symbols of N subframes in the specific radio frame in each period T, where N is greater than or equal to 1.

Exemplarily, a specific radio frame, in which the information about the SFN is sent, in a period is used as an example for description. Because a frequency division duplex (Frequency Division Duplex, FDD for short) system and a time division duplex (Time Division Duplex, TDD for short) system distinguish uplink data and downlink data in different manners, a method applied to the FDD system and a method applied to the TDD system are separately described.

Figure 2:
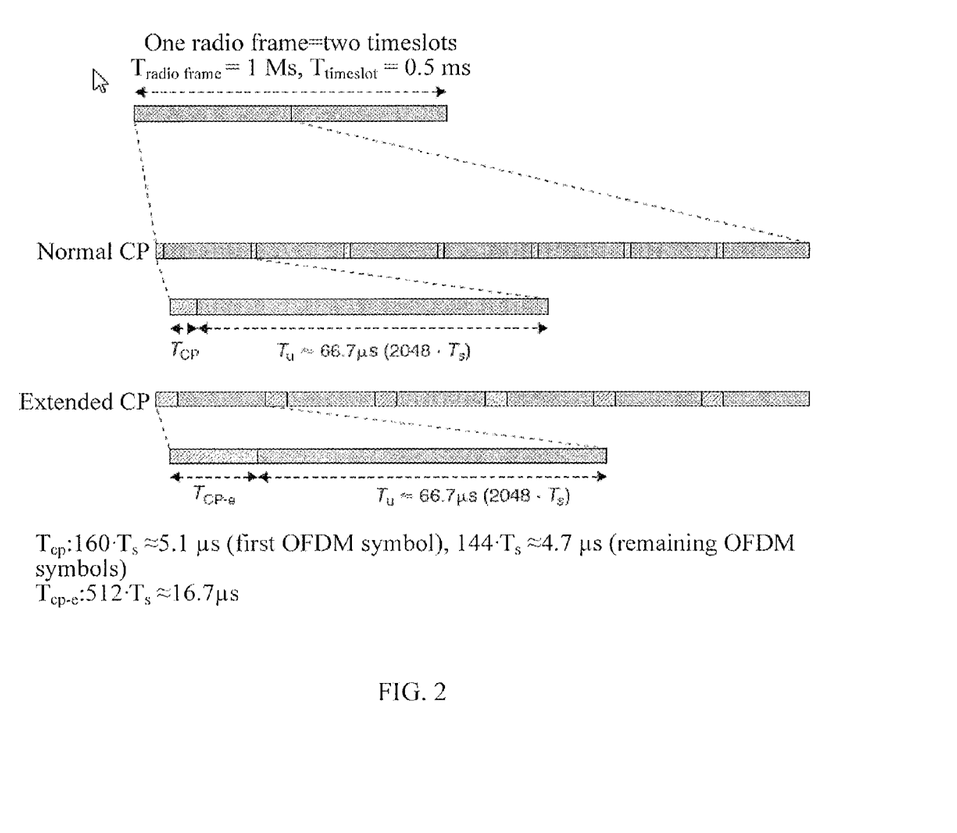
FIG. 2 is a schematic structural diagram of an FDD radio frame according to an embodiment of the present invention.

1. In the FDD system, uplink data and downlink data uses different frequencies, and therefore, uplink and downlink are distinguished by using frequency information. If a frequency domain position of a radio frame is in an uplink frequency range, all OFDM symbols within the radio frame are used for the uplink, or otherwise, if a frequency domain position of a radio frame is in a downlink frequency range, all OFDM symbols within the radio frame are used for the downlink.

Referring to FIG. 2, FIG. 2 is a schematic structural diagram of an FDD radio frame.

When the method is applied to the frequency division duplex FDD system, the PBCH may occupy the last 11 OFDM symbols of other subframes than a subframe 0 and a subframe 5 in the N subframes within the specific radio frame in each period T when a normal CP is used and the last 9 OFDM symbols of the other subframes when an extended CP is used, where N is greater than or equal to 1. A value of N may be set according to a standard, and the value of N is unchanged after being set. Certainly, the standard may also change the setting according to a requirement.

Alternatively, the PBCH occupies second timeslots of other subframes than a subframe 0 in the N subframes within the specific radio frame in each period T, where N is greater than or equal to 1.

Further, CRC information may be added, and a quantity of bits of the added CRC information is less than or equal to 8.

Figure 3:
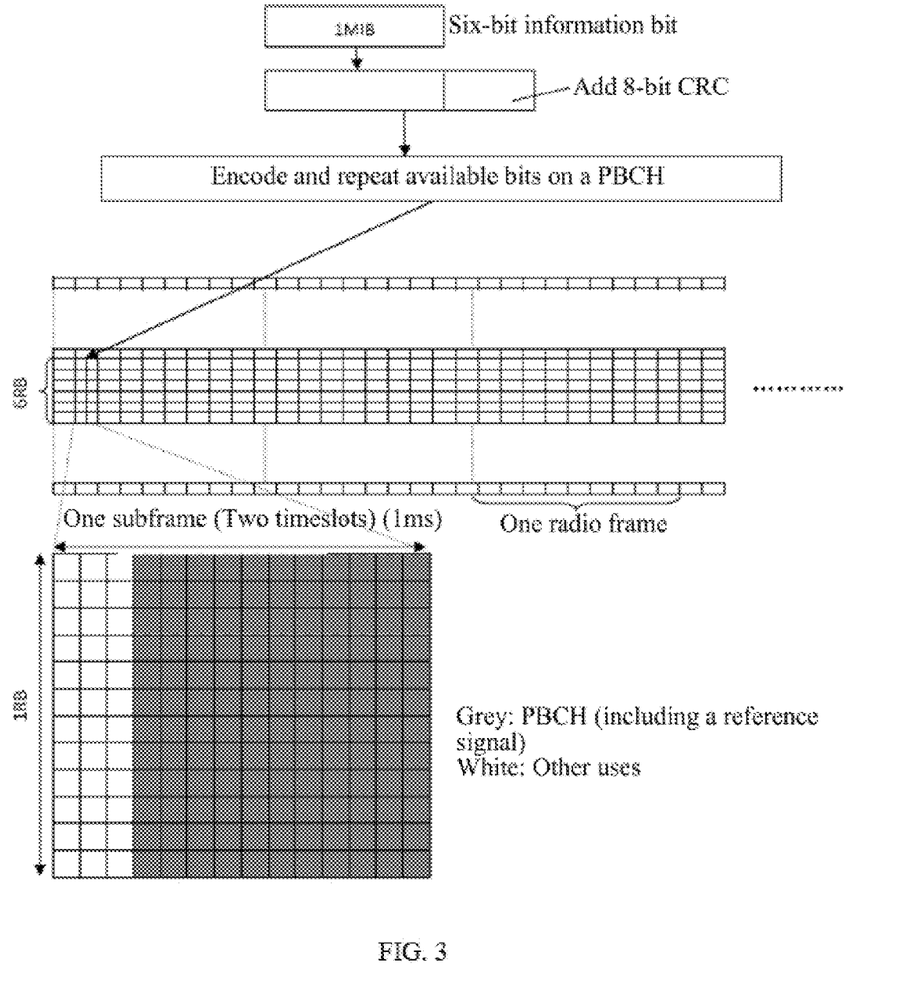
FIG. 3 is a schematic structural diagram of a TDD radio frame according to an embodiment of the present invention.

Referring to FIG. 3, FIG. 3 is a structural diagram of a specific PBCH in an FDD system, where a period of the PBCH is 160 ms; in the PBCH, there is totally 6-bit information about an SFN, with addition of 8-bit CRC information; and PBCH information is mapped to 72 subcarriers in a center, and occupies the last 11 OFDM symbols of a subframe 1 of a first radio frame in a period.

Figure 4:
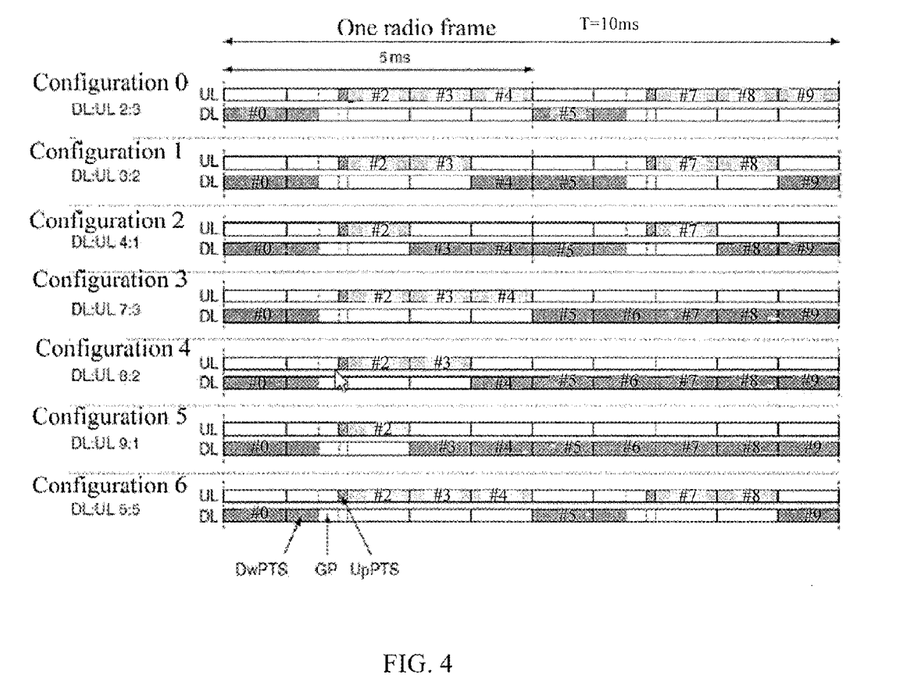
FIG. 4 is a schematic structural diagram of a PBCH according to an embodiment of the present invention.

2. In the TDD system, uplink data and downlink data use different time, and therefore uplink and downlink are distinguished by using time information. Within a radio frame, OFDM symbols are alternately used for the uplink or the downlink, and a rule of alternation is referred to as an uplink/downlink configuration. In an existing system, 7 different uplink/downlink configurations are configured, and when the method is applied to the time division duplex TDD system, a position, of the PBCH, within the specific radio frame is applicable to all the uplink/downlink configurations.

Referring to FIG. 4, FIG. 4 is a schematic structural diagram of a TDD radio frame, where DL represents downlink, and UL represents uplink. For example, the PBCH may occupy some or all of the following OFDM symbols within a specific radio frame: the third OFDM symbol in a subframe 1, the third OFDM symbol in a subframe 6, all OFDM symbols in a subframe 0, and all OFDM symbols in a subframe 5.

Preferably, the information in the PBCH may be sent in a spread-spectrum manner, and neighboring cells use different spreading codes.

The broadcast information sending method provided in this embodiment provides a new PBCH to send PBCH information, where the PBCH information only includes information about a system frame number SFN, so that the PBCH in this embodiment of the present invention carries less information, and accordingly occupies fewer system resources than an existing LTE PBCH does, thereby reducing system overheads, and achieving better coverage performance than the existing LTE PBCH does.

Figure 5:
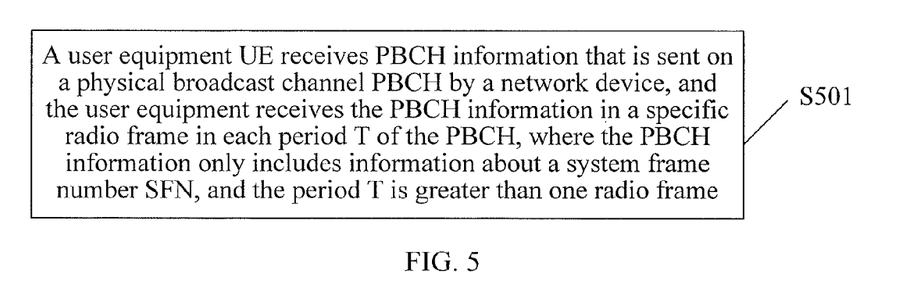
FIG. 5 is a flowchart of a broadcast information receiving method according to an embodiment of the present invention.

According to another aspect, an embodiment of the present invention provides a broadcast information receiving method. Referring to FIG. 5, the method includes:

S501: User equipment UE receives PBCH information that is sent, on a physical broadcast channel PBCH, by a network device to the UE, and the user equipment receives the PBCH information in a specific radio frame in each period T of the PBCH, where the PBCH information only includes information about a system frame number SFN, and the period T is greater than one radio frame.

Exemplarily, the specific radio frame may be set according to a standard.

A sum of a quantity $N_{SFN}$ of bits included in the information about the SFN and a quantity $N_T$ of bits that is corresponding to each period T of the PBCH is less than or equal to a total quantity K of bits required by the system frame number.

Preferably, the quantity of bits that is corresponding to each period of the PBCH is $N_T$=Ceiling ($\log_2 P$), where P is a quantity of radio frames included in each period T of the PBCH.

Preferably, P is an integral power of 2, and the quantity of bits that is corresponding to each period of the PBCH is $N_T=\log_2 P$.

Exemplarily, in a frequency domain, the information in the PBCH may be mapped to 72 subcarriers in a frequency domain center of an OFDM signal.

Exemplarily, when a network in which the PBCH is located does not coexist with another network, the PBCH and a synchronization signal are staggered in a time domain; or when a network in which the PBCH is located coexists with another network, the PBCH, a synchronization signal, and a PBCH of the another network are staggered in a time domain. For example, the PBCH occupies, in a time domain, all or some OFDM symbols of N subframes in a specific radio frame in each period T, where N is greater than or equal to 1.

Preferably, in an FDD system, the PBCH occupies the last 11 OFDM symbols of other subframes than a subframe 0 and a subframe 5 in the N subframes within the specific radio frame in each period T when a normal CP is used and the last 9 OFDM symbols of the other subframes when an extended CP is used, where N is greater than or equal to 1; or the PBCH occupies second timeslots of other subframes than a subframe 0 in the N subframes within the specific radio frame in each period T, where N is greater than or equal to 1.

In a time division duplex TDD system, a position, of the PBCH, within the specific radio frame is applicable to all uplink/downlink configurations. For example, the PBCH occupies some or all of the following OFDM symbols within the specific radio frame: the third OFDM symbol in a subframe 1, the third OFDM symbol in a subframe 6, all OFDM symbols in a subframe 0, and all OFDM symbols in a subframe 5.

Preferably, the information in the PBCH may be sent in a spread-spectrum manner, and neighboring cells use different spreading codes.

The broadcast information receiving method provided in this embodiment provides a new PBCH to receive PBCH information, where the PBCH information only includes information about a system frame number SFN, so that the PBCH in this embodiment of the present invention carries less information, and accordingly occupies fewer system resources than an existing LTE PBCH does, thereby reducing system overheads, and achieving better coverage performance than the existing LTE PBCH does.

Figure 6:
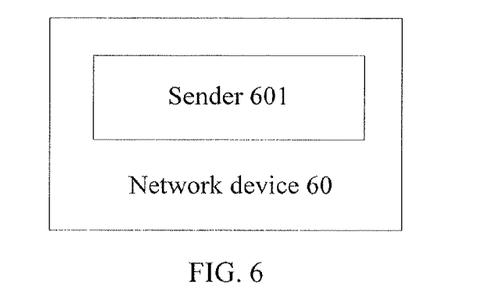
FIG. 6 is a structural diagram of a network device according to an embodiment of the present invention.

According to another aspect, an embodiment of the present invention provides a network device 60. Referring to FIG. 6, the network device 60 includes:

a sender 60, configured to send, on a physical broadcast channel PBCH, PBCH information to user equipment UE, and configured to send the PBCH information in a specific radio frame in each period T of the PBCH, where the PBCH information only includes information about a system frame number SFN, and the period T is greater than one radio frame Exemplarily, the network device 60 in this embodiment may solely send, on the PBCH, the information about the SFN, or may add the information about the SFN in an MIB message and then send the MIB message on the PBCH. In this case, the MIB message only includes the information about the SFN, without including downlink system bandwidth information and PHICH structure information, and therefore, an information amount on the PBCH is greatly reduced. By using an existing system frame number as an example, there are a total of 1024 existing system frame numbers, which range from 0 to 1023, and therefore, only 10 bits are required for transmission, which are 14 bits fewer than those required in the prior art. In this way, utilization of PBCH resources may be greatly reduced, and accordingly system overheads are reduced and coverage performance is improved.

Exemplarily, for ease of reliable reception of an LTE PBCH, and for further reducing an information amount on the PBCH, the network device 60 may use a time-diversity mechanism to send the information about the SFN to the UE on the PBCH. For example, the network device 60 sends the information about the SFN in a specific radio frame in each period T of the PBCH, and then a total quantity K of bits required by the system frame number may be at least constituted by a quantity $N_{SFN}$ of bits included in the information about the SFN together with a quantity $N_T$ of bits that is corresponding to the period T of the PBCH, and therefore, the quantity $N_{SFN}$ of bits included in the information about the SFN may meet $N_{SFN} \leq K-N_T$.

For example, when the total quantity K of bits required by the system frame number is only constituted by the quantity $N_{SFN}$ of bits included in the information about the SFN together with the quantity $N_T$ of bits that is corresponding to the period T of the PBCH, the quantity $N_{SFN}$ of bits included in the information about the SFN may be $K-N_T$, where $N_T$=Ceiling($\log_2 P$), P is a quantity of radio frames included in each period T of the PBCH, and each period T is greater than one radio frame. Exemplarily, when the period T is longer, $N_T$ is larger, and correspondingly, a smaller $N_{SFN}$ indicates a smaller information amount of the information about the SFN, but a delay of receiving the information about the SFN by the user equipment is also correspondingly prolonged. A preferred period T of this embodiment of the present invention ranges from 40 ms to 160 ms.

Preferably, when P is an integral power of 2, the quantity of bits that is corresponding to each period T of the PBCH is $N_T=\log_2 P$, and correspondingly, the quantity of bits included in the information about the SFN at least may be reduced by $\log_2 P$.

For example, it is assumed that each period T of the PBCH is 40 ms, 2-bit information in 10-bit information may be borne by frame positions in 40 ms, for example, 00 represents a first 10 ms frame, 01 represents a second 10 ms frame, 10 represents a third 10 ms frame, and 11 represents a fourth 10 ms frame. In this way, for the information about the SFN, only 8-bit information is required to represent a complete system frame number. For another example, when a longer period of the PBCH is used, for example, 160 ms, for the information about the SFN, only 6-bit information is required to represent a complete system frame number.

Exemplarily, the network device 60 in this embodiment of the present invention may transmit, in at least one radio frame of the period T, the information about the SFN, so that the user equipment may combine data of all radio frames in the at least one radio frame to acquire information about a complete SFN, where the at least one radio frame may be preset according to a standard. For example, how many radio frames in one period are specifically selected for transmission of the information about the SFN, and which radio frames are selected can be preset according to a standard. What is preset according to the standard is no longer changed during use, and certainly, the setting may also be changed according to a requirement.

Exemplarily, in order to facilitate spectrum spreading to acquire better coverage performance, the network device 60 in this embodiment of the present invention does not make each radio frame in the period T of the PBCH correspond to a redundancy version, and only the information about the SFN on the PBCH is simply repeated, without addition of any other information. Exemplarily, in order that the user equipment can determine positions of radio frames in a period so as to determine $N_T$ bits corresponding to the positions of the radio frames, the network device 60 may make an agreement with the user equipment in advance, for example, it may be agreed that the user equipment uses the information about the SFN in a period is received as a first radio frame (or a radio frame at a fixed position), and then remaining radio frames in the period are successively reckoned. For example, it is assumed that the period T is 160 ms, and each period T includes 16 radio frames, which are separately marked, in this embodiment, as a radio frame 1, a radio frame 2, a radio frame 3, . . . , a radio frame 16. A system sets that the network device 60 sends, in the radio frame 1, the radio frame 2, and the radio frame 5, the information about the SFN, and then the user equipment obtains information about a complete SFN after receiving data sent in the radio frame 1, the radio frame 2, and the radio frame 5; the user equipment may use the complete SFN as a system frame number of a current subframe (the radio frame 5), and then successively reckon remaining radio frames in the period.

Preferably, in order that the user equipment can more conveniently distinguish the positions of the radio frames in the period T, the network device 60 may transmit, in a specific radio frame in each period T, the information about the SFN. Exemplarily, the network device 60 may make an agreement with the user equipment in advance, and accordingly the user equipment may set by default that a radio frame in which the user equipment performs an access is a first radio frame (or a radio frame at a fixed position), and then successively reckon remaining radio frames in the period. For example, it is assumed that the period T is 160 ms, and each period T includes 16 radio frames, which are separately marked, in this embodiment, as a radio frame 1, a radio frame 2, a radio frame 3, . . . , a radio frame 16. A system sets that the network device 60 sends, in the radio frame 2, the information about the SFN, where the radio frame 2 is a radio frame in which the user equipment performs an access, and then the user equipment obtains information about a complete SFN after correctly receiving data sent in the radio frame 2; and the user equipment may use the complete SFN as a system frame number of a current subframe, and then successively reckon remaining radio frames in the period.

It should be noted that, the network device 60 may select each radio frame in the period T of the PBCH as a specific radio frame for sending the information about the SFN, and which radio frame in the period T of the PBCH is used for sending the information about the SFN is not limited in this embodiment, and may be preset according to a standard. Certainly, the standard may also change the setting according to a requirement.

Exemplarily, the PBCH in this embodiment may be a PBCH newly set by the network device 60 according to an available resource.

Exemplarily, in a frequency domain, the network device 60 may map the information in the PBCH to 72 subcarriers in a frequency domain center of an OFDM signal.

Exemplarily, when a network in which the PBCH is located does not coexist with another network, the PBCH and a synchronization signal are staggered in a time domain; or when a network in which the PBCH is located coexists with another network, the PBCH, a synchronization signal, and a PBCH of the another network are staggered in a time domain. For example, the PBCH may occupy all or some OFDM symbols of N subframes in the specific radio frame in each period T, where N is greater than or equal to 1.

Exemplarily, a specific radio frame, in which the information about the SFN is sent, in a period is used as an example for description. Because an FDD system and a TDD system distinguish uplink data and downlink data in different manners, the FDD system and the TDD system are separately described.

1. In the FDD system, uplink data and downlink data uses different frequencies, and therefore, uplink and downlink are distinguished by using frequency information. If a frequency domain position of a radio frame is in an uplink frequency range, all OFDM symbols within the radio frame are used for the uplink, or otherwise, if a frequency domain position of a radio frame is in a downlink frequency range, all OFDM symbols within the radio frame are used for the downlink.

Referring to FIG. 2, FIG. 2 is a schematic structural diagram of an FDD radio frame.

In the FDD system, the PBCH may occupy the last 11 OFDM symbols of other subframes than a subframe 0 and a subframe 5 in the N subframes within the specific radio frame in each period T when a normal CP is used and the last 9 OFDM symbols of the other subframes when an extended CP is used, where N is greater than or equal to 1. A value of N may be set according to a standard, and the value of N is unchanged after being set. Certainly, the standard may also change the setting according to a requirement.

Alternatively, the PBCH occupies second timeslots of other subframes than a subframe 0 in the N subframes within the specific radio frame in each period T, where N is greater than or equal to 1.

Further, CRC information may be added, and a quantity of bits of the added CRC information is less than or equal to 8.

Referring to FIG. 3, FIG. 3 is a structural diagram of a specific PBCH in an FDD system, where a period of the PBCH is 160 ms; in the PBCH, there is totally 6-bit information about an SFN, with addition of 8-bit CRC information; and PBCH information is mapped to 72 subcarriers in a center, and occupies the last 11 OFDM symbols of a subframe 1 of a first radio frame in a period.

2. In the TDD system, uplink data and downlink data use different time, and therefore uplink and downlink are distinguished by using time information. Within a radio frame, OFDM symbols are alternately used for the uplink or the downlink, and a rule of alternation is referred to as an uplink/downlink configuration. In an existing system, 7 different uplink/downlink configurations are configured, and in the TDD system, a position, of the PBCH, within the specific radio frame is applicable to all the uplink/downlink configurations.

Referring to FIG. 4, FIG. 4 is a schematic structural diagram of a TDD radio frame, where DL represents downlink, and UL represents uplink. For example, the PBCH may occupy some or all of the following OFDM symbols within a specific radio frame: the third OFDM symbol in a subframe 1, the third OFDM symbol in a subframe 6, all OFDM symbols in a subframe 0, and all OFDM symbols in a subframe 5.

Preferably, the PBCH information in the PBCH may be sent in a spread-spectrum manner, and neighboring cells use different spreading codes.

The network device 60 for sending broadcast information according to this embodiment provides a new PBCH to send PBCH information, and the PBCH information only includes information about a system frame number SFN, so that the PBCH in this embodiment carries less information, and accordingly occupies fewer system resources than an existing LTE PBCH does, thereby reducing system overheads, and achieving better coverage performance than the existing LTE PBCH does.

Figure 7:
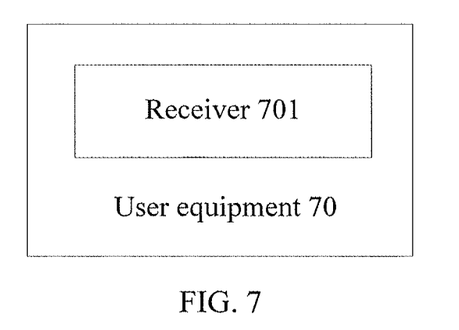
FIG. 7 is an apparatus structural diagram of user equipment according to an embodiment of the present invention.

According to another aspect, an embodiment of the present invention provides user equipment 70. Referring to FIG. 7, the user equipment 70 includes.

a receiver 701, configured to receive PBCH information that is sent, on a physical broadcast channel PBCH, by a network device to the user equipment UE 70, and configured to receive the PBCH information in a specific radio frame in each period T of the PBCH, where the PBCH information only includes information about a system frame number SFN, and the period T is greater than one radio frame Exemplarily, the specific radio frame may be set according to a standard.

A sum of a quantity $N_{SFN}$ of bits included in the information about the SFN and a quantity $N_T$ of bits that is corresponding to each period T of the PBCH is less than or equal to a total quantity K of bits required by the system frame number.

Preferably, the quantity of bits that is corresponding to each period T of the PBCH is $N_T$=Ceiling ($\log_2 P$), where P is a quantity of radio frames included in each period T of the PBCH.

Preferably, P is an integral power of 2, and the quantity of bits that is corresponding to each period of the PBCH is $N_T = \log_2 P$.

Exemplarily, in a frequency domain, the PBCH information in the PBCH may be mapped to 72 subcarriers in a frequency domain center of an OFDM signal.

Exemplarily, when a network in which the PBCH is located does not coexist with another network, the PBCH and a synchronization signal are staggered in a time domain; or when a network in which the PBCH is located coexists with another network, the PBCH, a synchronization signal, and a PBCH of the another network are staggered in a time domain. For example, the PBCH occupies, in a time domain, all or some OFDM symbols of N subframes in a specific radio frame in each period T, where N is greater than or equal to 1.

Preferably, in an FDD system, the PBCH occupies the last 11 OFDM symbols of other subframes than a subframe 0 and a subframe 5 in the N subframes within the specific radio frame in each period T when a normal CP is used and the last 9 OFDM symbols of the other subframes when an extended CP is used, where N is greater than or equal to 1; or the PBCH occupies second timeslots of other subframes than a subframe 0 in the N subframes within the specific radio frame in each period T, where N is greater than or equal to 1.

In a TDD system, a position, of the PBCH, within the specific radio frame is applicable to all uplink/downlink configurations. For example, the PBCH occupies some or all of the following OFDM symbols within the specific radio frame: the third OFDM symbol in a subframe 1, the third OFDM symbol in a subframe 6, all OFDM symbols in a subframe 0, and all OFDM symbols in a subframe 5.

Preferably, the PBCH information in the PBCH may be sent in a spread-spectrum manner, and neighboring cells use different spreading codes.

The user equipment 70 provided in this embodiment provides a new PBCH to receive PBCH information, and the PBCH information only includes information about a system frame number SFN, so that the PBCH in this embodiment carries less information, and accordingly occupies fewer system resources than an existing LTE PBCH does, thereby reducing system overheads, and achieving better coverage performance than the existing LTE PBCH does.

Figure 8:
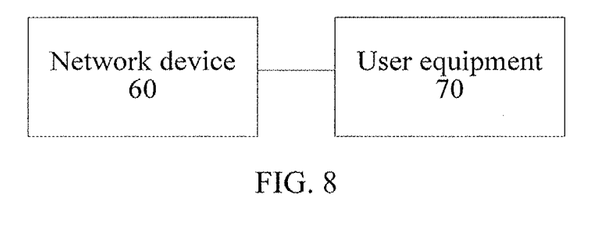
FIG. 8 is a diagram of a broadcast information sending and receiving system according to an embodiment of the present invention.

According to another aspect, an embodiment of the present invention provides a broadcast information sending and receiving system. Referring to FIG. 8, the system includes:

the network device 60 described in any one of the foregoing embodiments and the user equipment 70 described in any one of the foregoing embodiments.

The broadcast information sending and receiving system provided in this embodiment provides a new PBCH to send and receive PBCH information, and the PBCH information only includes information about a system frame number SFN, so that the PBCH in this embodiment carries less information, and accordingly occupies fewer system resources than an existing LTE PBCH does, thereby reducing system overheads, and achieving better coverage performance than the existing LTE PBCH does.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A broadcast information sending method, comprising:
   sending, by a network device on a physical broadcast channel (PBCH), PBCH information to a user equipment (UE) in a specific radio frame in each period T of the PBCH, wherein the PBCH information consists of information about a system frame number (SFN), and wherein the period T is greater than one radio frame;
   wherein a sum of a quantity $N_{SFN}$ of bits comprised in the information about the SFN and a quantity $N_T$ of bits that corresponds to each period T of the PBCH is less than or equal to a total quantity K of bits required by the SFN, wherein $N_{SFN}$, $N_T$ and K are positive integers.

2. The method according to claim 1, wherein the quantity $N_T$ of bits that corresponds to each period T of the PBCH is $N_T$=Ceiling ($\log_2 P$), wherein P is a quantity of radio frames comprised in each period T of the PBCH.

3. The method according to claim 1, wherein the quantity of bits $N_T$ that corresponds to each period T of the PBCH is $N_T$=$\log_2 P$, wherein P is a quantity of radio frames comprised in each period T of the PBCH and P is an integral power of 2.

4. The method according to claim 1, wherein the PBCH information is sent in a spread-spectrum manner.

5. A broadcast information receiving method, comprising:
   receiving, by a user equipment (UE), physical broadcast channel (PBCH) information sent from a network device to the UE on a PBCH in a specific radio frame in each period T of the PBCH, wherein the PBCH information consists of information about a system frame number (SFN), and wherein the period T is greater than one radio frame;
   wherein a sum of a quantity $N_{SFN}$ of bits comprised in the information about the SFN and a quantity $N_T$ of bits that corresponds to each period T of the PBCH is less than or equal to a total quantity K of bits required by the SFN, wherein $N_{SFN}$, $N_T$, and K are positive integers.

6. The method according to claim 5, wherein the quantity of bits $N_T$ that corresponds to each period T of the PBCH is $N_T$=Ceiling ($\log_2 P$), wherein P is a quantity of radio frames comprised in each period T of the PBCH.

7. The method according to claim 5, wherein the quantity of bits NT that corresponds to each period T of the PBCH is $N_T$=$\log_2 P$, wherein P is a quantity of radio frames comprised in each period T of the PBCH and P is an integral power of 2.

8. The method according to claim 5, wherein the PBCH information is sent from the network device in a spread-spectrum manner.

9. A network device, comprising:
   a sender, configured to send, on a physical broadcast channel (PBCH), PBCH information to a user equipment (UE) in a specific radio frame in each period T of the PBCH, wherein the PBCH information consists of information about a system frame number (SFN), and wherein the period T is greater than one radio frame;
   wherein a sum of a quantity $N_{SFN}$ of bits comprised in the information about the SFN and a quantity $N_T$ of bits that corresponds to each period T of the PBCH is less than or equal to a total quantity K of bits required by the SFN, wherein $N_{SFN}$, $N_T$, and K are positive integers.

10. The network device according to claim 9, wherein the quantity of bits $N_T$ that corresponds to each period T of the PBCH is $N_T$=Ceiling ($\log_2 P$), wherein P is a quantity of radio frames comprised in each period T of the PBCH.

11. The network device according to claim 9, wherein the quantity of bits $N_T$ that corresponds to each period T of the PBCH is $N_T$=$\log_2 P$, wherein P is a quantity of radio frames comprised in each period T of the PBCH and P is an integral power of 2.

12. The network device according to claim 9, wherein the sender is configured to send the PBCH information in a spread-spectrum manner.

13. A user equipment (UE), comprising:
   a receiver, configured to receive physical broadcast channel (PBCH) information from a network device on a PBCH in a specific radio frame in each period T of the PBCH, wherein the PBCH information consists of information about a system frame number (SFN), and wherein the period T is greater than one radio frame;
   wherein a sum of a quantity $N_{SFN}$ of bits comprised in the information about the SFN and a quantity $N_T$ of bits that corresponds to each period T of the PBCH is less than or equal to a total quantity K of bits required by the SFN, wherein $N_{SFN}$, $N_T$, and K are positive integers.

14. The user equipment according to claim 13, wherein the quantity of bits $N_T$ that corresponds to each period T of the PBCH is $N_T$=Ceiling ($\log_2 P$), wherein P is a quantity of radio frames comprised in each period T of the PBCH.

15. The user equipment according to claim 13, wherein the quantity of bits $N_T$ that corresponds to each period T of the PBCH is $N_T$=$\log_2 P$, wherein P is a quantity of radio frames comprised in each period T of the PBCH and P is an integral power of 2.

16. The user equipment according to claim 13, wherein the receiver is configured to receive PBCH information that is sent from the network device in a spread-spectrum manner.

* * * * *

UNITED STATES PATENT AND TRADEMARK OFFICE
CERTIFICATE OF CORRECTION

PATENT NO. : 9,801,172 B2  
APPLICATION NO. : 14/873988  
DATED : October 24, 2017  
INVENTOR(S) : Lyu et al.

It is certified that error appears in the above-identified patent and that said Letters Patent is hereby corrected as shown below:

In the Claims

Column 18, Line 4, Claim 7, "NT" should read -- $N_T$ --.

Signed and Sealed this  
First Day of May, 2018

Andrei Iancu  
*Director of the United States Patent and Trademark Office*